US010696321B2

(12) United States Patent
Riot et al.

(10) Patent No.: US 10,696,321 B2
(45) Date of Patent: Jun. 30, 2020

(54) SYSTEM FOR MODIFICATION OF THE STEERING RATIO FOR A VEHICLE PROVIDED WITH A STEERING WHEEL, AND CORRESPONDING VEHICLE

(71) Applicant: MANITOU BF, Ancenis (FR)

(72) Inventors: Antoine Riot, Ancenis (FR); Mickael Christiny, Ancenis (FR)

(73) Assignee: MANITOU BF, Ancenis (FR)

( * ) Notice: Subject to any disclaimer, the term of this patent is extended or adjusted under 35 U.S.C. 154(b) by 0 days.

(21) Appl. No.: 15/763,729

(22) PCT Filed: Sep. 30, 2016

(86) PCT No.: PCT/FR2016/052510
§ 371 (c)(1),
(2) Date: Mar. 27, 2018

(87) PCT Pub. No.: WO2017/055773
PCT Pub. Date: Apr. 6, 2017

(65) Prior Publication Data
US 2018/0215411 A1 Aug. 2, 2018

(30) Foreign Application Priority Data
Oct. 1, 2015 (FR) ...................................... 15 59353

(51) Int. Cl.
*B62D 6/00* (2006.01)
*B66F 9/065* (2006.01)
(Continued)

(52) U.S. Cl.
CPC .............. *B62D 6/002* (2013.01); *B62D 6/02* (2013.01); *B66F 9/0655* (2013.01);
(Continued)

(58) Field of Classification Search
None
See application file for complete search history.

(56) References Cited

U.S. PATENT DOCUMENTS 4,971,173 A 11/1990 Takahashi
5,265,019 A 11/1993 Harara et al.
(Continued)

FOREIGN PATENT DOCUMENTS

DE 10008984 8/2001
DE 10355933 6/2005
(Continued)

OTHER PUBLICATIONS

International Search Report dated Jun. 10, 2016.
(Continued)

*Primary Examiner* — Thomas G Black
*Assistant Examiner* — Demetra R Smith-Stewart
(74) *Attorney, Agent, or Firm* — Ipsilon USA, LLP

(57) ABSTRACT

The invention relates to a modification system for modifying the steering ratio for a vehicle having steered wheels (11), a steering wheel (10), and a steering transmission device (20) serving to transmit steering movement between the steering wheel (10) and the steered wheels (11) with a steering ratio R=Alpha/Beta, where Alpha is the turning angle of the steering wheel, and Beta is the steering angle of the wheels; said system comprising a device for determining the angular speed of the steering wheel. Said system comprises a module (102) for controlling the steering ratio R configured to calculate the steering ratio as a function of the angular speed of the steering wheel (10). The invention also relates to a wheeled vehicle fitted with such a steering ratio modification system.

9 Claims, 3 Drawing Sheets

(51) Int. Cl.
*B66F 9/075* (2006.01)
*E02F 9/22* (2006.01)
*B62D 6/02* (2006.01)
*E02F 9/20* (2006.01)

(52) U.S. Cl.
CPC .......... *B66F 9/07568* (2013.01); *E02F 9/225* (2013.01); *E02F 9/2087* (2013.01)

(56) References Cited

U.S. PATENT DOCUMENTS

| | | | |
|---|---|---|---|
| 6,244,373 B1 | 6/2001 | Kojo et al. | |
| 6,542,801 B2 | 4/2003 | Kawashima | |
| 7,624,836 B2 | 12/2009 | Huang | |
| 8,862,329 B2 | 10/2014 | Hayama | |
| 2003/0114970 A1* | 6/2003 | Hara | B62D 5/008 701/41 |
| 2004/0016594 A1* | 1/2004 | Yasui | B60T 8/17551 180/446 |
| 2005/0209752 A1* | 9/2005 | Ono | B62D 5/008 701/41 |
| 2006/0006020 A1* | 1/2006 | Ono | B62D 5/008 180/446 |
| 2006/0180381 A1 | 8/2006 | Sonderegger et al. | |
| 2006/0232025 A1 | 10/2006 | Braud | |
| 2008/0116000 A1 | 5/2008 | Huang et al. | |

FOREIGN PATENT DOCUMENTS

| | | | |
|---|---|---|---|
| DE | 102013008979 | 12/2014 | |
| EP | 1236638 | 9/2002 | |
| EP | 1236638 B1 | 9/2002 | |
| EP | 1593642 | 11/2005 | |
| EP | 2276689 | 1/2011 | |
| EP | 2374692 | 10/2011 | |
| FR | 3041922 | 4/2017 | |
| JP | 2015168294 | 9/2015 | |
| WO | WO-2014047874 A1 * | 4/2014 | ............... B62D 5/06 |

OTHER PUBLICATIONS

International Search Report dated Jan. 16, 2017.
U.S. Office action dated Feb. 27, 2019.
EU third party Opposition dated Apr. 14, 2020.
Sheryn, Hinton, "An illustrated history of fork-lift trucks" United Kingdom: Ian Allan Publishing, 2000.
Encyclopaedia Britannica, Inc., "Forklift Trucks" Mar. 12, 2014.
Youtube / 3T Training Ltd, "@forklift Training—3T Training Limited" Sep. 14, 2013.
Youtube / Atlanta Liquidation, "2002 Crown RC 3000 Series Electric Ryder Forklift Model RC3020 30 Capacity 4825 Lbs" Jan. 10, 2015.
Mitsubishi Caterpillar Forklift America Inc, "Anatomy of a Forklift".

\* cited by examiner

_SYSTEM FOR MODIFICATION OF THE STEERING RATIO FOR A VEHICLE PROVIDED WITH A STEERING WHEEL, AND CORRESPONDING VEHICLE_

RELATED APPLICATION

This application is a National Phase of PCT/FR2016/052510, filed on Sep. 30, 2016, which in turn claims the benefit of priority from French Patent application No. 15 59353, filed on Oct. 1, 2015 the entirety of which are incorporated by reference.

FIELD OF THE INVENTION

In general, the present invention relates to modifying the steering ratio for a wheeled vehicle, and to a corresponding vehicle.

PRIOR ART

In order to move objects between two zones, it is known to use a load-handling vehicle that the driver moves by steering the wheels in one direction in order to reach a first zone, e.g. so as to pick up a load. In order to reach a second zone for unloading, the driver must reverse and then move the vehicle forwards while steering the wheels in the other direction.

However, in order to steer the wheels in one direction or the other, i.e. in order to bring the wheels into full lock in one direction or the other, the driver must turn the steering wheel through several complete turns, which is tedious and time consuming.

In general, it is desirable to be able to drive such a load-handling vehicle in precise, comfortable, and safe manner.

An object of the present invention is to propose a novel system and a corresponding wheeled vehicle making it possible to overcome all or some of the above-described problems.

SUMMARY OF THE INVENTION

To this end, the invention provides a modification system for modifying the steering ratio for a vehicle having steered wheels, a steering wheel, and a steering transmission device serving to transmit steering movement between the steering wheel and the steered wheels with a steering ratio R=Alpha/Beta, where Alpha is the turning angle of the steering wheel, and Beta is the steering angle of the wheels; said system being characterized in that it comprises a device for determining the angular speed of the steering wheel, and a control module for controlling the steering ratio R that is configured to calculate the steering ratio as a function of the angular speed of the steering wheel.

The ability to vary the steering ratio as a function of the angular speed of the steering wheel, makes it possible to adapt the steering sensitivity of the vehicle to the conditions in which the vehicle is being used.

In particular, such a design makes it possible to limit the number of times the steering wheel needs to be turned completely in order to bring the wheels into full lock in one direction or the other when the driver wishes to steer the wheels quickly.

Thus, provision may be made for the ratio to be reduced when the steering wheel is turned quickly so that the driver can steer the wheels of the vehicle quickly with limited angular movement of the steering wheel. Conversely, when the driver wishes to approach a zone in precise manner, and to do so turns the steering wheel slowly, provision may be made for the ratio to be increased so that the driver can maintain precise positioning of the vehicle.

According to an advantageous characteristic of the invention, said control is configured to reduce the steering ratio R when the angular speed of the steering wheel increases (assuming that other possible calculation parameters remain unchanged).

According to an advantageous characteristic of the invention, the module for controlling the steering ratio is configured in such a manner as to calculate the steering ratio also as a function of the travel speed of the vehicle. Advantageously, the steering ratio increases when the speed of the vehicle increases.

According to an advantageous characteristic of the invention, said module for controlling the steering ratio R is configured to calculate the steering ratio as a function of the angular speed of the steering wheel when the speed of the vehicle is in a given speed range, referred to as a "low" speed range, with calculation of the steering ratio being independent of the angular speed of the steering wheel above this speed range, or with the influence of the angular speed of the steering wheel on the steering ratio being reduced further for a vehicle speed above this low speed range.

According to an advantageous characteristic of the invention said module for controlling the steering ratio R is configured to calculate the steering ratio as a function of the angular speed of the steering wheel when the speed of the vehicle is in a "low" speed range, in the range 0 kilometers per hour (km/h) to 10 km/h, preferably in the range 0 km/h to 8 km/h, e.g. in the range 0 km/h to 5 km/h. Provision may further be made for this range to be limited to the range 0 km/h to 2 km/h or 3 km/h.

Preferably, the steering ratio is independent of the angular speed of the steering wheel above this low speed range, or with the influence of the angular speed of the steering wheel on the steering ratio is reduced for a vehicle speed above this low speed range.

Provision may be made for the modification of the ratio as a function of the angular speed of the steering wheel to be applied over the entire vehicle speed range, e.g. from 0 km/h to 40 km/h. However, as explained above, this modification of the angular speed ratio may be limited to a range of vehicle speeds in order to inhibit or to reduce the influence of the angular speed of the steering wheel outside this range for safety reasons.

The control module may calculate the steering ratio as a function of additional parameters, such as other steering wheel handling parameters. According to an advantageous characteristic of the invention, said steering wheel handling parameter of the steering wheel comprises the angular acceleration of the steering wheel.

According to an advantageous characteristic of the invention, said steering wheel handling parameter comprises the angular position of the steering wheel and/or its uninterrupted angular stroke.

According to an advantageous characteristic of the invention, said vehicle includes a tiltable telescopic boom arm, and the system includes an angle sensor for sensing the angle formed between the telescopic arm and the bearing plane of the wheels of the vehicle on the ground, and the module for controlling the steering ratio is configured in such a manner as to calculate the steering ratio also as a function of the value of the angle, referred to as the boom angle, formed between the telescopic arm and the bearing plane of the wheels of the vehicle on the ground, in such a manner as to increase the steering ratio when the boom angle increases.

According to an advantageous characteristic of the invention, the steering ratio R may also be modified as a function of the length of the telescopic arm.

According to an advantageous characteristic of the invention, said system includes a load sensor configured to determine the load at, or in the vicinity of, the end of the telescopic arm, and the module for controlling the steering ratio is configured to modify the steering ratio R as a function of said determined load.

During a load handling operation with a vehicle having a tiltable telescopic boom arm, the end of which is designed to carry a load, there exists a risk of the vehicle tipping over when it is not operated in safe manner. Modification of the steering ratio as a function of parameters relating to the arm, which parameters are the angle and/or the length of said arm, or also the load at the end of the arm, makes it possible to keep the vehicle comfortable to maneuver while guaranteeing appropriate safety conditions.

The invention further provides a wheeled vehicle including:
steered wheels;
a steering wheel; and
a steering transmission device serving to transmit steering movement between the steering wheel and the steered wheels with a steering ratio R=Alpha/Beta, where Beta is the steering angle of the wheels, and Alpha is the turning angle of the steering wheel;
said vehicle being characterized in that it also includes a system for modifying the steering ratio as described above.

According to an advantageous characteristic of the invention, the module for controlling the steering ratio is configured in such a manner as to modify the steering ratio also as a function of accelerator pedal depression.

According to an advantageous characteristic of the invention, the steering transmission device comprises a hydraulic circuit.

According to an advantageous characteristic of the invention, the hydraulic circuit comprises:
a pump, also referred to as an "integral pump", making it possible to pressurize the hydraulic circuit;
a hydraulic valve system coupled to the steered wheels;
a steering pump making it possible to direct the steering fluid towards one side or the other of the or each valve of the hydraulic valve system as a function of the turning of the steering wheel; and
a system for increasing flow rate, preferably a proportional solenoid valve, that can be controlled by the control module for causing additional steering fluid flow to be added into the hydraulic circuit as a function of the steering ratio defined by the control module.

According to an advantageous characteristic of the invention, the vehicle includes a first computer configured to process data from the sensor(s) and to drive the electrical actuators of the vehicle, and a second computer connected to the first computer and that includes said module for controlling the steering ratio.

According to an advantageous characteristic of the invention, said vehicle has four steered wheels.

BRIEF DESCRIPTION OF THE DRAWINGS

Other characteristics and advantages of the invention can be seen better on reading the following description, which is purely illustrative and non-limiting and should be read with reference to the accompanying drawings, in which.

DETAILED DESCRIPTION

Figure 1:
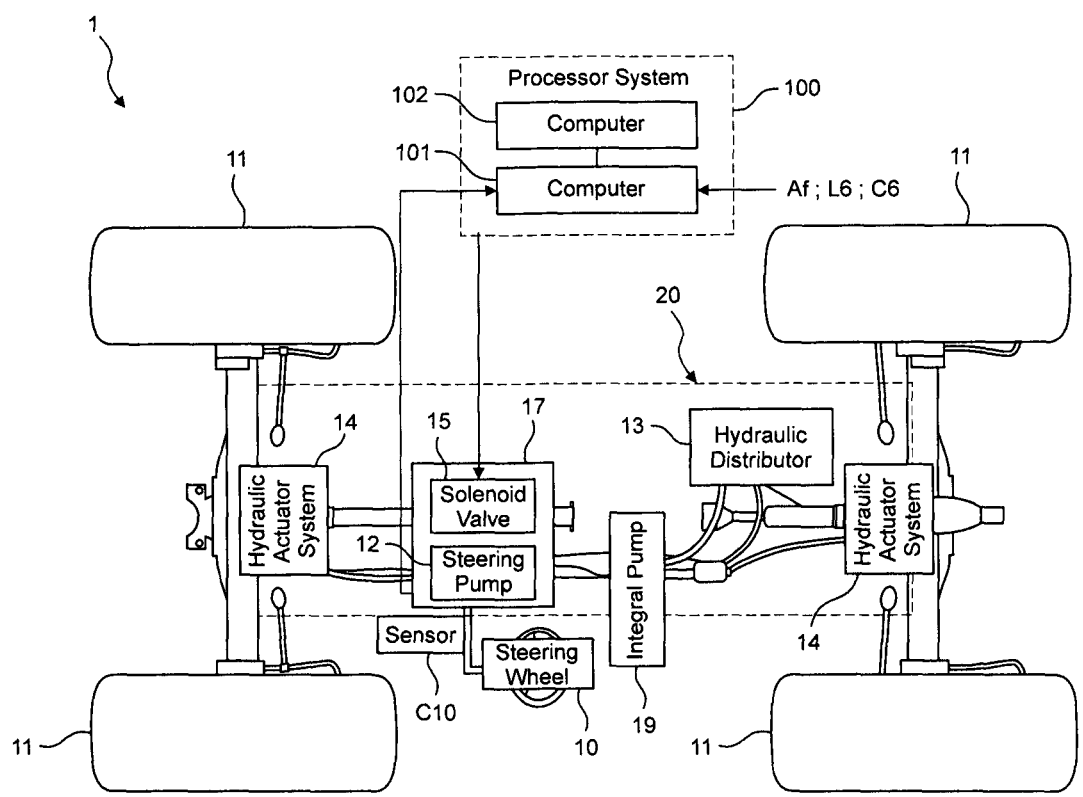
FIG. 1 is a diagrammatic plan view of a system for modifying the steering ratio for a wheeled vehicle, in accordance with an embodiment of the invention.

The concept of the invention is described more completely below with reference to the accompanying drawings, in which embodiments of the concept of the invention are shown. In the drawings, the sizes and the relative sizes of elements of the vehicle may be exaggerated for reasons of clarity. Similar numbers refer to similar elements in all of the drawings. However, this concept of the invention may be implemented in numerous different forms and should not be interpreted as being limited to the embodiments described herein. Instead of that, these embodiments are proposed so that the description is complete, and they communicate the extent of the concept of the invention to the person skilled in the art. Consequently, the extent of the invention is defined by the accompanying claims. For reasons of simplification, the embodiments below are examined in relation to the terminology and structure of a wheeled load-handling vehicle. However, the embodiments that are examined below are not limited to such load-handling vehicles, but can be applied to other wheeled vehicles.

A reference in any part of the description to "an embodiment" indicates that a particular function, structure, or characteristic described with reference to an embodiment is included in at least one embodiment of the present invention. Thus, the occurrence of the term "in an embodiment" in various places throughout the description does not necessarily refer to the same embodiment. Furthermore, the particular functions, structures, or characteristics may be combined in any appropriate manner in one or more embodiments.

FIG. 1 is a diagram showing a wheeled vehicle 1 comprising a steering wheel 10 and a sensor C10 for sensing the turning angle of the steering wheel in such a manner as to be able to calculate a parameter representative of how the steering wheel is being handled.

The sensor C10 may be arranged in such a manner as to detect the swivel angle of the steering column coupled to the steering wheel 10. The sensor C10 makes it possible to determine the angular speed of the steering wheel by differentiating the swivel angle.

The sensor C10 is connected to a computer 101 for controlling components of the vehicle. Acquiring the swivel angle of the steering wheel 10 as a function of time makes it possible for the computer 101, or another computer 102 connected to said computer 101, to calculate the angular position, the angular speed (or turning speed), the angular acceleration, and also the angular stroke covered by the steering wheel in uninterrupted manner.

In the embodiment shown in the figures, the wheeled vehicle has four-wheel steering. In a variant, provision may be made for only the front wheels of the vehicle to be steered wheels. At least two of the wheels are drive wheels. All four wheels may be drive wheels in such a manner as to enable the wheels to be steered in a crab configuration so as to be able to approach a given zone with precision.

The vehicle includes a steering transmission device 20 serving to transmit steering movement between the steering wheel 10 and the steered wheels 11. This movement is transmitted with a given steering ratio R, also referred to merely as the steering ratio. The steering ratio is defined by R=Alpha/Beta with Beta being the steering angle of the wheels, and Alpha being the turning angle of the steering wheel.

Thus, when the steering wheel 10 is turned through an angle Alpha, the steering transmission device steers the steered wheels 11 through the angle Beta defined by the steering ratio R.

As described below, the vehicle includes a module 102 for controlling the steering ratio R. The module 102 for controlling the steering ratio is configured to calculate (or modify) the steering ratio as a function of the angular speed of the steering wheel 10. As explained above, the angular speed may be calculated by means of the angle sensor C10.

With the module 102 for controlling the steering ratio of the computer, the steering transmission device 20 thus forms a variable ratio steering system making it possible to vary the ratio between the angle of the steering wheel and the angle of the wheel.

The module 102 for controlling the steering ratio R is configured in such a manner that the steering ratio R reduces when the angular speed Va of the steering wheel increases.

It may be considered that the angular speed Va of the steering wheel lies in the range [0; Va_max] with Va_max being in the range 2 to 4 revolutions per second, preferably 2.5 revolutions per second.

Figure 4:
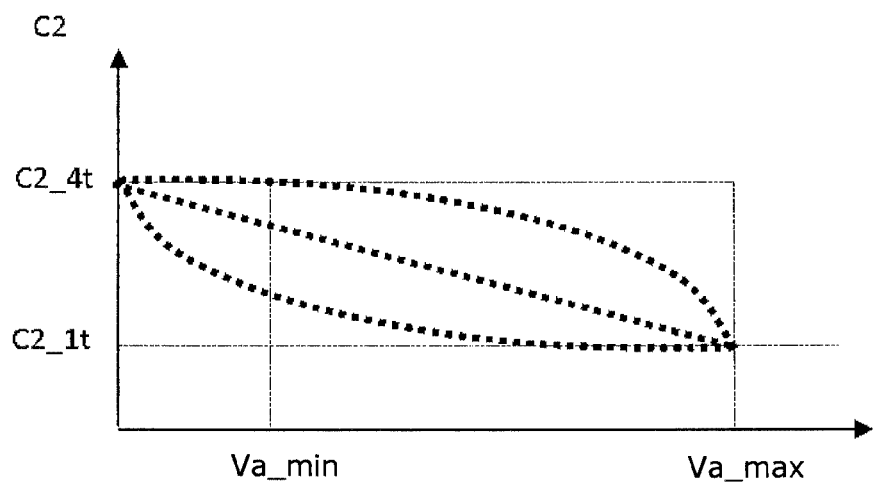
FIG. 4 is a graph providing an example curve for a correction factor for calculating the steering ratio as a function of the angular speed of the steering wheel, in accordance with an embodiment of the invention.

Provision may thus be made for the steering ratio applied to be of the R=C2 type. In the example of FIG. 4, the value of C2 decreases from a value C2_4t, for a steering wheel angular speed that is equal to 0, until it reaches a value C2_1t, for a steering wheel angular speed that is equal to Va_max. In this configuration, the value C2—1t corresponds to the need to perform one complete turn of the steering wheel in order to steer the wheels from one full lock to the other, whereas the value C2_4t corresponds to the need to perform four complete turns of the steering wheel in order to steer the wheels from one full lock to the other.

Such a configuration of the control module makes it possible to improve positioning accuracy of the vehicle, in particular when the vehicle speed is low or zero, and the driver turns the steering wheel slowly in order to move the vehicle with precision, while also making it easier to maneuver the vehicle when the driver turns the steering wheel quickly, in particular in order to change direction, so as to move from one zone to another, the speed of the vehicle remaining low.

In other words, assuming that possible other calculation parameters remain unchanged, the steering ratio is high when the turning speed of the steering wheel is low, and is lower when the turning speed is greater. Preferably, the value of the steering ratio is also determined as a function of one or more other parameters, such as the travel speed of the vehicle, as described below.

Preferably, the module 102 for controlling the steering ratio R is configured in such a manner as to modify the steering ratio R by also taking into account the travel speed of the vehicle. The travel speed of the vehicle may be transmitted to the control module 102 by the computer 101 of the vehicle.

In particular, provision may be made for the steering ratio R that is to be applied to be calculated based on a "main" or "standard" steering ratio, given reference R1 that is a function of the vehicle speed Vv, to which the value C2 is applied as a correction factor, which value C2 is a function of the angular speed of the steering wheel. By way of example, the value C2_1t can be set at 1 and the value C2_4t at 4.

In other words, provision may be made for the steering ratio R that is to be applied to be calculated with a formula of the type:

$$R=R1*C2$$

Figure 3:
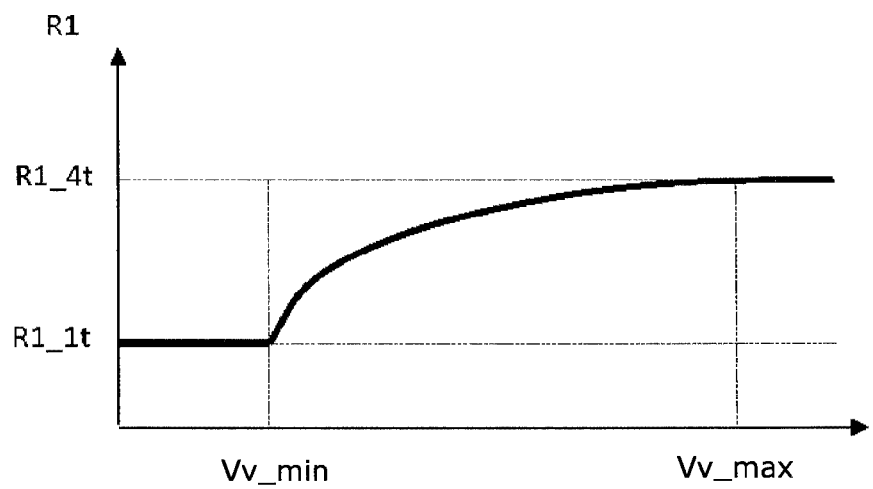
FIG. 3 is a graph providing an example curve for a main steering ratio as a function of the travel speed of the vehicle, in accordance with an embodiment of the invention.

In the embodiment shown in FIG. 3, which is a graph plotting the curve of the main steering ratio, given reference R1, as a function of the travel speed of the vehicle, given reference Vv, the main steering ratio R1 is held at a constant value (the minimum value R1_1t), from 0 km/h (vehicle stopped) until it reaches a given speed value, given reference Vv_min. In the embodiment shown, the minimum value R1_1t corresponds to the fact that the driver needs to turn the steering wheel through only one complete turn in order to steer the wheels from full lock on one side to full lock on the other side.

Above the speed Vv_min, the value of R1 increases until it reaches for Vv_max a maximum value R1_4t corresponding in the example shown to needing to turn the steering wheel through four complete turns in order to steer the wheels from full lock on one side to full lock on the other side. In the embodiment in FIG. 3, the curve of R1 is of the logarithmic type from Vv_min. Naturally, other types of curve may be envisaged.

In this embodiment, again with reference to the graph shown in FIG. 4 that plots the curve of the correction coefficient C2 as a function of the angular speed of the steering wheel, given reference Va, the correction coefficient C2 is reduced when the angular speed Va of the steering wheel increases. The reduction may optionally be linear (in particular of concave or convex shape) as shown by the various dotted lines.

The control module then calculates the steering ratio R that is to be applied by correcting the main steering ratio R1 defined as a function of the speed Vv of the vehicle (FIG. 3) by the correction coefficient C2 that is defined as a function of the angular speed of the steering wheel (FIG. 4).

Thus, when stopped or when at a very low speed, i.e. for a speed of the vehicle that is less than Vv_min, and when the driver turns the steering wheel slowly, e.g. for a value Va that is less than Va_min, the steering ratio R is calculated by correcting the value of R1 (which is thus close to or equal to R1_1t, which corresponds to a need to perform only one complete turn of the steering wheel in order to steer the wheels from full lock on one side to full lock on the other side), by means of the correction factor C2 (having a value close to C2_4t that is considerable, e.g. equal to 4, due to the slow speed at which the steering wheel is being turned).

The value of Va_min may lie in the range 0 to 2 revolutions per second, preferably in the range 0 to 1 revolutions per second, or in the range 0.1 to 0.5 revolutions per second. By way of example, Va_min may be selected to lie in the range 0 to 0.2 revolutions per second.

The computer performs the operation R=R1*C2, i.e. R=R1_1t*4.

Conversely, when stopped or when at a very low speed, i.e. for a speed of the vehicle that is less than Vv_min, and when the driver turns the steering wheel quickly, e.g. for a value Va that is greater than Va_min and close to Va_max, the steering ratio R is calculated by correcting the value of R1 (which is thus close to or equal to R1_1t, which corresponds to a need to perform only one complete turn of the steering wheel in order to steer the wheels from full lock on one side to full lock on the other side), by means of the correction factor C2 (having a value close to C2_1t that is low, e.g. equal to 1, due to the high speed at which the steering wheel is being turned).

The computer performs the operation R=R1*C2, i.e. R=R1_1t*1 so that the steering ratio value that is to be applied corresponds to the need to perform one complete turn of the steering wheel in order to steer the wheels between full lock on both sides.

Thus, by turning the steering wheel quickly, the operator can maneuver quickly in order to travel at low speed from one point to another, which is particularly useful for loading or unloading between two zones that are close to each other. There is no need to turn the steering wheel a large number of times in order to maneuver the vehicle. Conversely, the driver may operate the vehicle with precision by turning the steering wheel gently in order to position the vehicle correctly in front of the desired zone.

At high speed, R1 approaches the value R1_4t that is greater than R1_1t, which makes it possible to increase the value of the steering ratio R that is to be applied and thus to increase the amount of angular movement the steering wheel needs to perform in order to steer the wheels, which improves driving safety.

In an embodiment, the influence of the angular speed on the steering ratio is reduced, or even eliminated, beyond a given travel speed in order to prioritize safety.

In the embodiment shown in FIG. 4, when the angular speed of the steering wheel increases, the curve C2 decreases between a maximum value C2_4t corresponding to a need to perform a greater angular movement, e.g. four complete turns, of the steering wheel in order to steer the wheels between both full locks and a value C2_1t corresponding to a need to perform a smaller angular movement, e.g. one complete turn of the steering wheel, in order to steer the wheels between both full locks. Such a design for the module for controlling the steering ratio makes it possible, at high travel speeds of the vehicle, to maintain steering that is more stiff and less sensitive so as to retain comfort and safety for driving the vehicle, while also making it possible for the vehicle, at low speed, to benefit from a high steering ratio at low angular speeds of the steering wheel and from a low steering ratio at high angular speeds of the steering wheel.

Provision may be made for the correction factor C2 to be taken into account over the whole range of travel speeds of the vehicle or over a portion only.

Figure 2:
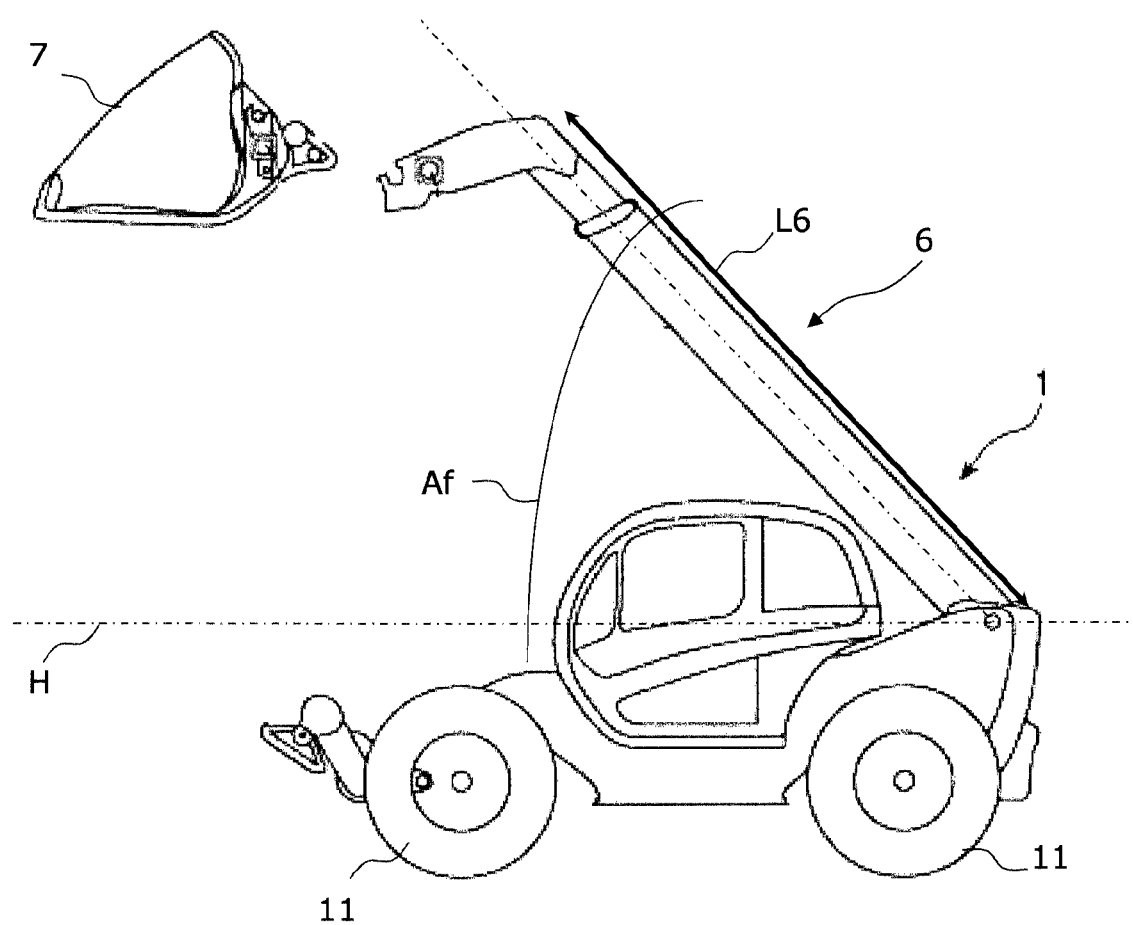
FIG. 2 is a diagrammatic side view of a load-handling vehicle, in accordance with an embodiment of the invention, the vehicle including a telescopic boom arm fitted with a bucket that is shown detached from the end of the arm.

In a particular embodiment shown in FIG. 2, the vehicle is of the type having a telescopic boom arm. The chassis of the vehicle 1 carries a telescopic arm 6 that is hinged about a substantially horizontal axis. In the embodiment shown in FIG. 2, the telescopic arm 6 is designed to be fitted at its distal end with a bucket 7. The telescopic arm 6 is raised or lowered while being tilted at an angle Af relating to the horizontal plane H. The telescopic arm 6 may be extended or retracted. The arm thus presents a length L6. The length L6 and the angle Af of the telescopic arm are measured by sensors connected to a computer of the vehicle.

In an embodiment, the module 102 for controlling the steering ratio R is configured to modify the steering ratio R as a function of the angle, referred to as the boom angle Af, formed between the telescopic arm and the ground plane on which the wheels of the vehicle bear. The description below describes the boom angle being taken into account in order to calculate the steering ratio, but it also applies to the taking into account of some other parameter relating to the telescopic arm, such as its length or the load at the end of its arm.

In particular, the control module 102 for controlling the steering ratio R is configured in such a manner as to calculate the steering ratio R also as a function of the value of the boom angle Af so as to increase the steering ratio when the boom angle increases (assuming that the other parameters remain unchanged).

Thus, in an embodiment, the steering ratio R that is to be applied is calculated by the formula:

$$R=R1*C2*C3$$

C2 is the correction factor that is a function of the angle value of the steering wheel. C2 decreases from the value C2_4t, e.g. equal to 4, when the value of the steering wheel speed Va is zero, until it reaches the value C2_1t, e.g. equal to, when the value of the steering wheel speed Va is maximum.

Figure 5:
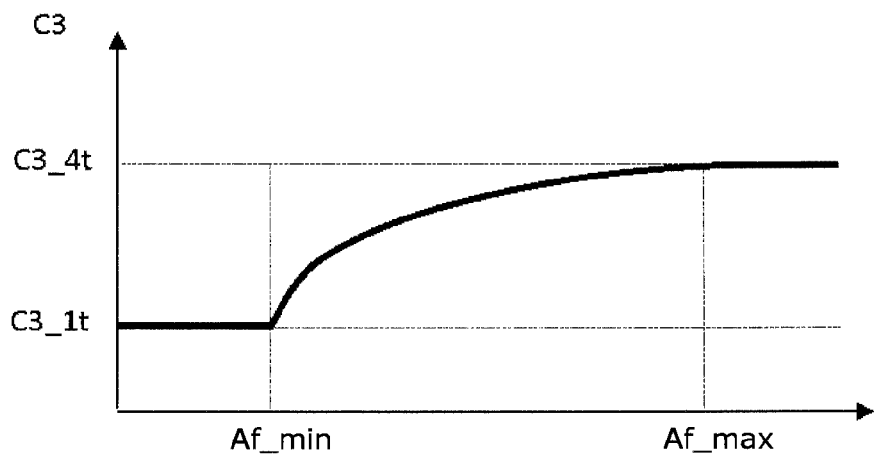
FIG. 5 is a graph providing an example curve for a correction factor for calculating the steering ratio as a function of the angle formed between the telescopic arm of the vehicle and the ground, in accordance with an embodiment of the invention.

C3 is a correction factor that is a function of the value of the boom angle. In the embodiment of FIG. 5, the value of the correction factor C3 increases from a value C3_1t, e.g. equal to 1, for a given boom angle value Af_min, referred to as the minimum boom angle, until it reaches a value C3_4t, e.g. equal to 4, for the boom angle value Af_max that lies for example in the range 30° to 45°, preferably 35°. Provision may be made for Af_min to lie in the range 5° to 25°, e.g. 15°.

In the embodiment of FIG. 5, the value of the correction factor is constant when the boom angle value lies in the range 0 to Af_min. In the embodiment of FIG. 5, the curve of C3 is of the logarithmic type from Vv_min. Naturally, other types of curve may be envisaged.

Thus, taking the boom angle into account makes it possible to increase the value of the steering ratio when the angle exceeds the value Af_min, which makes it possible to further improve the maneuvering safety of the vehicle, by preventing said vehicle from tipping over.

In a manner similar to taking into account the correction factor C2, provision may be made for the correction factor C3 to be taken into account over the whole range of travel speeds of the vehicle or over a portion only. The ranges in which the correction coefficients C2 and C3 are taken into account may optionally overlap, totally or in part.

Advantageously, the steering ratio R is also modified as a function of the length L6 of the telescopic arm. The ground plane on which the wheels bear is usually the horizontal plane.

In order to reduce the risk of the vehicle tipping over, provision may also be made for the steering ratio to be increased when the length of the arm and/or the load increases.

Advantageously, the vehicle also includes a load sensor C6 configured to determine the load at, or in the vicinity of, the end of the telescopic arm 6. The module 102 for controlling the steering ratio is thus configured to modify the steering ratio R as a function of said determined load, which makes it possible to increase the steering ratio in the event of a load that is greater than a threshold value.

The vehicle includes a processor system 100 for computer calculation that comprises the first computer 101 configured to process data from the sensors and to control the electrical actuators of the vehicle. A second computer 102 is connected to the first computer 101. Said steering ratio control module is implemented in said second computer 102. In a variant, said first computer and the second computer may be made in the form of a single electronic and/or computer processor unit, i.e. in the form of a single computer.

The steering transmission device 20 is of the hydraulic type. In an embodiment shown in FIG. 1, the steering transmission device 20 comprises a hydraulic steering circuit put under pressure by a pump 19, also referred to as an "integral pump". The steering transmission circuit 20 comprises a hydraulic actuator system 14 coupled to the steered wheels 11. The hydraulic actuator system comprises hydraulic actuators that make it possible to direct the wheels in one direction or the other and at a steering angle that is given as a function of the turning of the steering wheel. In the embodiment shown in the figures, the front wheels and the rear wheels are steered wheels in such a manner that the actuator system comprises two actuators. In a variant, when only the front wheels are steered, provision may be made for the actuator system to comprise a single actuator.

The vehicle also comprises a hydraulic distributor 13, that forms a priority valve, so as to guarantee a sufficient flow rate available for the hydraulic steering circuit regardless of the other accessory hydraulic functions.

A steering pump 12, formed by a three-port valve, is coupled to the steering wheel 10 in such a manner as to deliver a steering fluid flow, provided by the integral pump 19, as a function of the turning of the steering wheel, preferably also as a function of the speed of the vehicle and possibly as a function of a parameter of the telescopic arm, such as the boom angle. The steering pump 12 directs the steering fluid delivered by the integral pump 19 to one side or the other of each of the actuators 14 as a function of the direction in which the steering wheel 10 is being turned.

The vehicle also includes a proportional solenoid valve 15 that can be controlled by the control module 102 for controlling the amount of an additional steering fluid flow that is added into the hydraulic circuit as a function of the steering ratio defined by the control module.

The proportional solenoid valve may be housed with the steering pump within a single casing 17 referred to as an Orbitrol valve, or it may be arranged in some other location in the hydraulic system between the steering pump and the actuator system.

Thus, in a particular embodiment, the angular position sensor enables the processor and calculation system 100 to measure the angular speed of the steering wheel. The control module 102 thus determines the steering ratio that is to be applied as a function of said speed and thus controls, e.g. via the vehicle control computer 101, activation of the proportional solenoid valve in such a manner as to inject into the hydraulic actuator system 14 a fluid flow corresponding to the calculated steering ratio. Preferably, the control module 102 also determines the steering ratio to be applied as a function of the speed of the vehicle and possibly as a function of a parameter of the telescopic arm, such as the boom angle.

Provision may be made for the vehicle to include deactivation means making it possible to deactivate the control module 102 for controlling the steering ratio so that the steering ratio is the steering ratio defined by default. By way of example, deactivation may be triggered following detection of the vehicle malfunctioning.

The processor and calculation system, or the or each computer, may be made in the form of electronic components and/or of a computer processor, e.g. of the microprocessor or microcontroller type. The module for controlling the steering ratio may thus be made in the form of implemented programs that comprise computer instructions making it possible to perform their function, or in the form of dedicated electronic components.

These computer programs, or computer instructions, may be contained in program storage devices, e.g. computer-readable digital data storage media, or executable programs. The programs or instructions may also be executed from program storage peripherals.

Advantageously, provision may be made for the steering ratio to reach or to be fixed at a certain value until a given travel speed of the vehicle is reached, and then to increase the steering ratio R as the travel speed increases in order to tend towards a default steering ratio. The term "default steering ratio" refers to the steering ratio that results from construction of the vehicle without the ratio control module being activated. Such a design facilitates maneuvering the vehicle when stopped or when at a very low speed, while maintaining safety and comfort when driving at higher speeds by limiting the reactivity of the vehicle.

It should be observed that the steering ratio is conventionally defined as being equal to Alpha/Beta but, in a variant, the steering ratio could be defined as being equal to Beta/Alpha, which does not change the fact that the steering ratio is modified as a function of the angular speed of the steering wheel. Naturally, the formulas for calculating the steering ratio in the various embodiments should thus be adapted to the convention being used.

The invention is not limited to the embodiments shown in the drawings. Consequently, it should be understood that, when the characteristics mentioned in the accompanying claims are followed by references, those references are included solely with the aim of improving understanding of the claims and in no way limit the ambit of the claims.

In addition, the term "comprising" does not exclude other elements or steps. Furthermore, characteristics or steps that are described with reference to one of the above-described embodiments may also be used in combination with other characteristics or steps of other above-described embodiments.

The invention claimed is:

1. A modification system for modifying the steering ratio for a vehicle having steered wheels, a steering wheel, and a steering transmission device serving to transmit steering movement between the steering wheel and the steered wheels with a steering ratio R=Alpha/Beta, where Alpha is the turning angle of the steering wheel, and Beta is the steering angle of the wheels;

said system comprising a device for determining the angular speed of the steering wheel, and a control module for controlling the steering ratio R that is configured to calculate the steering ratio as a function of the angular speed of the steering wheel, wherein said control module is configured to reduce the steering ratio R when the angular speed of the steering wheel increases, and wherein said module for controlling the steering ratio R is configured to calculate the steering ratio as a function of the angular speed of the steering wheel when the speed of the vehicle is in a given speed range, referred to as a "low" speed range, the steering ratio being independent of the angular speed of the steering wheel above this low speed range, or with the influence of the angular speed of the steering wheel on the steering ratio being reduced for a vehicle speed above this low speed range.

2. A system according to claim 1, wherein the module for controlling the steering ratio is configured in such a manner as to calculate the steering ratio also as a function of the travel speed of the vehicle.

3. A system according to claim 1, wherein said module for controlling the steering ratio R is configured to calculate the steering ratio as a function of the angular speed of the steering wheel when the speed of the vehicle is in a speed range in the range 0 km/h to 10 km/h, preferably in the range 0 km/h to 8 km/h, e.g. in the range 0 km/h to 5 km/h.

4. A system according to claim 1, wherein, said vehicle includes a tiltable telescopic boom arm, the system includes an angle sensor (Af) for sensing the angle formed between the telescopic arm and the bearing plane of the wheels of the vehicle on the ground, and the module for controlling the steering ratio (R) is configured in such a manner as to calculate the steering ratio also as a function of the value of the angle, referred to as the boom angle, formed between the telescopic arm and the bearing plane of the wheels of the vehicle on the ground, in such a manner as to increase the steering ratio when the boom angle increases.

5. A system according to claim 4, wherein, said system includes a load sensor configured to determine the load at, or in the vicinity of, the end of the telescopic arm, and the module for controlling the steering ratio is configured to modify the steering ratio R as a function of said determined load.

6. A wheeled vehicle including:
steered wheels;
a steering wheel; and
a steering transmission device serving to transmit steering movement between the steering wheel and the steered wheels with a steering ratio R=Alpha/Beta, where Beta is the steering angle of the wheels, and Alpha is the turning angle of the steering wheel;
said vehicle being wherein said wheeled vehicle also includes a system for modifying the steering ratio in accordance with claim 1.

7. A vehicle according to claim 6, wherein the module for controlling the steering ratio is configured in such a manner as to modify the steering ratio also as a function of accelerator pedal depression.

8. A vehicle according to claim 6 or claim 7, wherein the steering transmission device comprises a hydraulic circuit.

9. A vehicle according to claim 8, wherein the hydraulic circuit comprises:
a pump, also referred to as an "integral pump", making it possible to pressurize the hydraulic circuit;
a hydraulic valve system coupled to the steered wheels;
a steering pump making it possible to direct the steering fluid towards one side or the other of the or each valve of the hydraulic valve system as a function of the turning of the steering wheel; and
a system for increasing flow rate, preferably a proportional solenoid valve, that can be controlled by the control module for causing additional steering fluid flow to be added into the hydraulic circuit as a function of the steering ratio defined by the control module.

* * * * *